United States Patent [19]
Akkara et al.

[11] Patent Number: 6,096,859
[45] Date of Patent: Aug. 1, 2000

[54] PROCESS TO CONTROL THE MOLECULAR WEIGHT AND POLYDISPERSITY OF SUBSTITUTED POLYPHENOLS AND POLYAROMATIC AMINES BY ENZYMATIC SYNTHESIS IN ORGANIC SOLVENTS, MICROEMULSIONS, AND BIPHASIC SYSTEMS

[75] Inventors: Joseph A. Akkara, Holliston; David L. Kaplan, Stow; Madhu Ayyagari, Brighton, all of Mass.

[73] Assignee: The United States of America as represented by the Secretary of the Army, Washington, D.C.

[21] Appl. No.: 08/598,737

[22] Filed: Jan. 16, 1996

[51] Int. Cl.$^7$ .................................. C08F 6/12; C08J 3/14
[52] U.S. Cl. ..................... 528/501; 528/502 C; 528/503; 528/86; 528/210; 528/212; 528/214; 528/215; 435/132; 435/156; 435/190; 435/192
[58] Field of Search ........................ 528/86, 501, 502 C, 528/503, 210, 212, 214, 215; 435/132, 156, 190, 192

[56] References Cited

U.S. PATENT DOCUMENTS

| | | | |
|---|---|---|---|
| 4,900,671 | 2/1990 | Pokora et al. | 435/156 |
| 5,153,298 | 10/1992 | Pokora et al. | 528/86 |
| 5,212,044 | 5/1993 | Liang et al. | 430/192 |
| 5,278,055 | 1/1994 | Cyrus et al. | 435/156 |
| 5,324,436 | 6/1994 | John et al. | 210/638 |

OTHER PUBLICATIONS

Dorick, J.S.; Marletta, M.A.; Kilbanov, A.M.; 30 Biotechnol. Bioeng. 31 (1987).

Akkara, J.A.; Senecal, K.J.; Kaplan, D.L., 29 J. Polm. Sci. A 1561 (1991).

Rao, A.M.; John, V.T.; Gonzalez, R.D.; Akkara, J.A.; Kaplan, D.L.; 41 Biotechnol. Bioeng. 531 (1993).

Kurioka, H.; Komatsu, I.; Uyama, H.; Kobayashi, S., 15 Macromol. Rapid Commun. 507 (1994).

Ryu, K.; Stafford, D.R.; Dorick, J.S., 389 ACS Symp. Ser. 141 (1989).

Bruno, F.; Akkara, J.A.; Samuelson, L.A.; Kaplan, D.L.; Marx, K.A.; Tripathy, S.K., 5(5) J. Intel. Mat. Sys. Struct. 631 (1994).

Kamat, S.V.; Iwaskewycz, B.; Beckman, E.J.; Russell, A.J., 90 Proc. Natl. Acad. Sci. USA 2940 (1993).

Y–P. Xu, G–L Huang and Y–T. Ye, 47 Biotechnol. Bioeng. 117 (1995).

*Primary Examiner*—Duc Truong
*Attorney, Agent, or Firm*—Vincent J. Ranucci

[57] ABSTRACT

A process of controlling the molecular weight and dispersity of poly(p-ethylphenol) and poly(m-cresol) synthesized enzymatically by varying the composition of the reaction medium. Polymers with low dispersities and molecular weights from 1000 to 3000 are synthesized in reversed micelles and biphasic systems. In comparison, reactions in bulk solvents resulted in a narrow range of molecular weights (281 to 675 with poly(p-ethylphenol) in a DMF/water system and 1,400 to 25,000 with poly(m-cresol) in an ethanol/water system). Poly(p-ethylphenol) was functionalized at hydroxyl positions with palmitoyl, cinnamoyl, and biotin groups.

19 Claims, 9 Drawing Sheets

R = CH$_3$ or C$_2$H$_5$, R' = CH$_3$

R = CH$_3$ or C$_2$H$_5$, R' = CH$_3$ (a)

(b)

6,096,859

PROCESS TO CONTROL THE MOLECULAR WEIGHT AND POLYDISPERSITY OF SUBSTITUTED POLYPHENOLS AND POLYAROMATIC AMINES BY ENZYMATIC SYNTHESIS IN ORGANIC SOLVENTS, MICROEMULSIONS, AND BIPHASIC SYSTEMS

STATEMENT OF GOVERNMENT INTEREST

The invention described herein may be manufactured and used by the Government for governmental purposes without the payment of any royalty thereon.

FIELD OF THE INVENTION

The present invention relates generally to the preparation of phenolic and aromatic amine polymers, wherein the reaction conditions are controlled such that high product yields, molecular weight, and a uniform molecular weight distribution are obtained.

BACKGROUND OF THE INVENTION

Phenolic and aromatic amine polymer resins constitute a very important and useful class of chemical compounds. They have a number of uses, e.g., as coatings and laminates that provide a number of functional advantages. Besides possessing good thermal properties, these polymers can be doped to make them electrically conductive, making them a key component of integrated circuit (IC) chips.

At present, these polymers are prepared by chemical synthesis, e.g., as from phenol and formaldehyde. The polymers's linearity/network structure (and, by extension, their functional properties) varies depending on the monomer and type of reaction conditions used. However, the use of certain constituent chemicals, such as formaldehyde, is being restricted in the chemical industry because of their toxicity. Accordingly, the enzyme-mediated synthesis of polyphenols and polyaromatic amines offers a viable alternative to the currently used chemical synthesis of such commercial phenolic resins.

Peroxidase-catalyzed free radical polymerization of phenol, aromatic amines, and their derivatives is well known. Horseradish peroxidase (HRP) is the most widely used biocatalyst in the polymerization of phenol, aniline, or their derivatives. HRP has been shown to be active in a number of organic solvents or solvent mixtures and the reaction is typically initiated by the addition of hydrogen peroxide as an oxidant.

Dordick et al., Vol. #30 1987 *Biotechnol. Bioeng.* 31–36, used HRP in a dioxane/water system to prepare a number of polymers and copolymers from various phenolic monomers. Akkara et al., 29 *J. Poylm. Sci.* A 1561 (1991), prepared polymers and copolymers of various phenols and aromatic amines using these same reactions and carried out detailed characterization of the polymer products. p-Alkylphenols were also polymerized at oil-water (reversed micelles) and air-water (Langmuir-Blodgett trough) interfaces. Because of their amphiphilic nature, the alkylphenols are positioned at the interface, and in the presence of HRP and hydrogen peroxide the monomers are oxidatively coupled to form polymers. The poly(p-alkylphenols) prepared in reversed micelles were shown to exhibit relatively more uniform molecular weight distribution than those prepared in bulk organic solvents.

However, earlier attempts to control the polymer molecular weight and molecular weight distribution by varying the time of reaction or hydrogen peroxide concentration were unsuccessful in both reversed micelles and bulk solvents. Initial hydrogen peroxide concentration was found to be stoichiometrically proportional to the monomer conversion, a hallmark of stepwise polymerization and a phenomenon observed previously, and there was no effect on the polymer molecular weight and polydispersity.

The polymers can be modified by adding functional groups to the polymeric backbone, significantly enhancing the utility of these polymers. "Functionalization" enables the polymers to be used to treat fabrics, to form selectively permeable membranes, and to improve the performance of IC chips, among other applications.

Palmitoyl chloride may be added to the polymer to make the polymer easily processable, e.g., as coatings, films, or finishes. Cinnamoyl chloride may be added to create controlled pore size membranes (e.g., "molecular sieves") or to enhance the polymers's ability to absorb UV radiation (e.g., for sunglasses), thereby enabling their use as anti-reflective coatings in photoresists. In their latter use, the modified polymers are applied to a silicon substrate as an undercoating (under non-functionalized polyphenols or polyaromatic amines that are then applied as a spin coating) in an IC chip to control the precision of UV etching, by inhibiting UV scattering, of circuitry into the spin-coated polymer layer. In addition, these cinnamoyl chloride-modified polymers are very thermostable, which allows their use in a variety of applications where heat is ordinarily a problem. In contrast, photosensitive functional groups may be added to enhance the utility of the polymers in other applications.

The polymers also may be modified to create active matrices and systems allowing the controlled-release of materials, such as drugs, insecticides, and fertilizers. If biotin groups are added to the polymer chain, the polymer can be used as chromatography packing, which may be used to separate and purify proteins.

Despite the study of how the functionality of the polymers varies depending upon whether, and with what, the molecules are modified, it has not been shown that the molecular weight and the molecular weight distribution (i.e., the "polydispersity") of polyphenols and polyaromatic amines also can significantly influence the functional properties of the polymers.

Accordingly, it is an object of this invention to overcome the above illustrated inadequacies and problems of extant polyphenols and polyaromatic amines by providing an improved method of their manufacture suitable for use in applications that would benefit from uniform polymer size.

It is another object of this invention to provide a method of producing polyphenols and polyaromatic amines wherein it is possible to control the molecular weight distribution of the polymer molecules.

Yet another object of the present invention is to provide a method of producing polyphenols and polyaromatic amines wherein the molecular weight distribution of the polymer molecules is between 600 and 3,600.

It is a further object of the present invention to provide a method of producing polyphenols and polyaromatic amines wherein the molecular weight distribution of the polymer molecules is between 1,400 and 25,000.

A still further object is to provide a method of producing polyphenols and polyaromatic amines wherein it is possible to control the polydispersity of the polymer molecules.

It is another object of this invention to provide a method of producing polyphenols and polyaromatic amines wherein the polydispersity of the polymer molecules ranges from 1.02 to greater than 2.

It is yet another object of the present invention to provide a method to modify the polymer prepared by adding functional groups to the polymer using palmitoyl chloride, cinnamoyl chloride, and biotin compounds.

SUMMARY OF THE INVENTION

The objects of the present invention are met by a method of enzymatically synthesizing polyphenols and polyaromatic amines under controlled reaction conditions. More particularly, the invention relates to the control of molecular weight and polydispersity in enzymatically synthesized polyphenols and polyaromatic amines by manipulating the several reaction parameters.

The present invention defines reaction conditions for any given phenol/aromatic amine monomer necessary to control $M_w$ and polydispersity within a defined range. Such control of $M_w$ and polydispersity has been found to increase the utility of these polymers.

In particular, the ability to control the molecular weight and dispersity of poly(p-ethylphenol) and poly(m-cresol) has been achieved. The polymers were synthesized enzymatically in different organic solvents and a water-in-oil microemulsion. Using solubility parameters, the composition of the reaction medium was varied to study the effects on polymer yield, molecular weight, and dispersity. It has been discovered that polymers with low dispersities and with molecular weights ranging from 1000 to 3000 can be synthesized in reversed micelles. In addition, it has been discovered that reactions conducted in bulk solvents resulted in a narrow range of molecular weights (281 to 675 with poly(p-ethylphenol) in a dimethylformamide (DMF)/water system and 1,400 to 25,000 with poly(m-cresol) in an ethanol/water system).

With DMF as the chromatography eluent, the effect of LiBr in DMF on the molecular aggregation of poly(p-ethylphenol) was determined using gel permeation chromatography (GPC). The presence of LiBr (at 0.35 w/v %) in DMF resulted in complete dissociation of the aggregates in solution. Further, poly(p-ethylphenol) was functionalized at hydroxyl positions with palmitoyl and cinnamoyl groups. Structural characterization of the polymers was carried out by $^{13}$C-NMR, UV, and FTIR spectroscopies.

Other objects, features and advantages will be apparent from the following detailed description of preferred embodiments thereof taken in conjunction with the accompanying drawings.

DETAILED DESCRIPTION OF EMBODIMENTS

Figure 1:
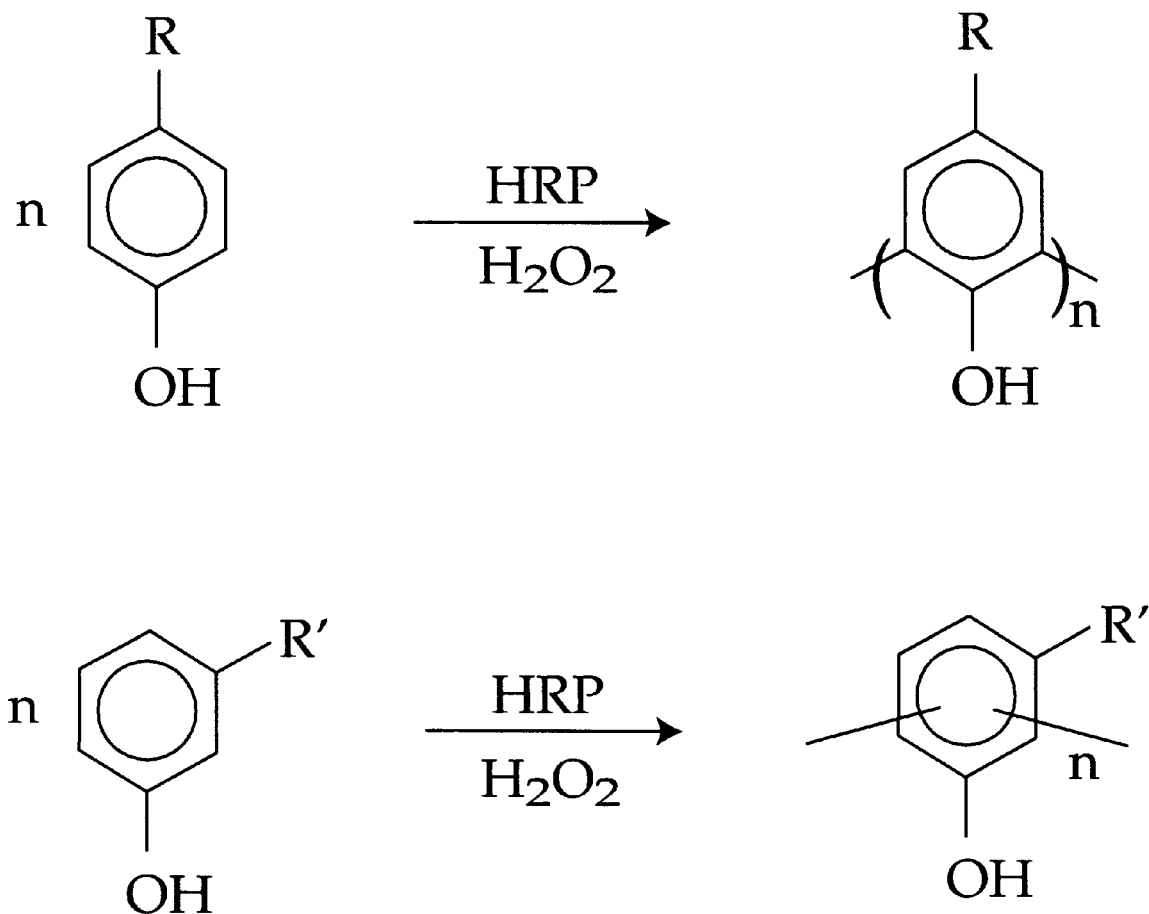
FIG. 1 is a schematic of ortho- and para-substituted phenol polymerization catalyzed by horseradish peroxidase (HRP)

Free radical polymerization of p-ethylphenol and m-cresol, catalyzed by horseradish peroxidase, was carried out at ambient conditions in a number of organic solvent systems. While the AOT/isooctane reversed micellar system afforded complete monomer conversion into polymer with an average molecular weight of 2,500, the addition of chloroform yielded lower molecular weights, with narrower distributions. Reactions carried out in DMF produced mostly oligomers with uniform molecular weights. Poly(m-cresol) molecular weight could be controlled between 1,400 and 25,000 by appropriate design of the reaction medium comprised of ethanol-water mixture. Analysis of poly(p-ethylphenol) by GPC demonstrated the effect of LiBr on the molecular weights of poly(p-ethylphenol) and poly(p-phenylphenol). The polymers showed apparently high molecular weights in DMF as GPC solvent due to significant inter/intra-molecular associations. At 0.35% LiBr in DMF and above, these associations were eliminated to permit the estimation of true molecular weights. $^{13}$C-NMR and FTIR studies revealed that the repeat units in poly(p-ethylphenol) are primarily linked at ortho positions. The hydroxyl groups, which are not involved in bond formation, could be derivatized with palmitoyl and cinnamoyl chlorides.

EXAMPLE 1

A typical polymerization reaction was carried out in reversed micelles as follows. A 10 ml solution of 0.15 M dioctyl sodium sulfosuccinate (AOT) in isooctane was prepared, and 0.4 ml of an aqueous preparation of horseradish peroxidase (Type II) (12.5 µM) was added to form a clear reversed micellar solution having a $W_o$ (molar ratio of water to surfactant) of about 15. p-Ethylphenol was added to the reversed micellar solution, and the polymerization reaction was initiated by adding drops of 30% hydrogen peroxide (w/w) (up to about 30% stoichiometric excess) while stirring the reaction mixture.

The reaction was exothermic with rapid formation of a yellowish precipitate. After continuing the stirring for several hours, the precipitate was centrifuged and washed repeatedly with pure isooctane to remove the surfactant and any unreacted monomer. The final precipitate was dried overnight under a reduced pressure at 50° C.

EXAMPLE 2

In cases where a mixture of chloroform and isooctane was used to form reversed micelles, the same procedure was followed except that the corresponding solvent mixture was used in place of isooctane. Isooctane and chloroform were stored with molecular sieves to remove water from the solvents. However, stable (i.e., transparent and single-phase) reversed micellar solutions were found to be difficult to form with a mixture of chloroform and isooctane with 25% or less isooctane. A stable microemulsion could be obtained only up to a $W_o$ of 9 with 50% chloroform at room temperature, and phase separation occurred at higher values.

EXAMPLE 3

In the absence of reversed micelles, reaction mixtures were prepared by first dissolving the monomer and the enzyme in a mixture of HEPES (N-[2-Hydroxyethyl] piperazine-N'[2-ethanesulfonic acid]) buffer and solvent such as N,N-dimethylformamide (DMF). The reaction was initiated, as before, by the dropwise addition of hydrogen peroxide. The enzyme was completely soluble at 0.5 mg/ml concentration in DMF/water mixtures at all solvent compositions studied.

A. Structural Characterization

Figure 2:
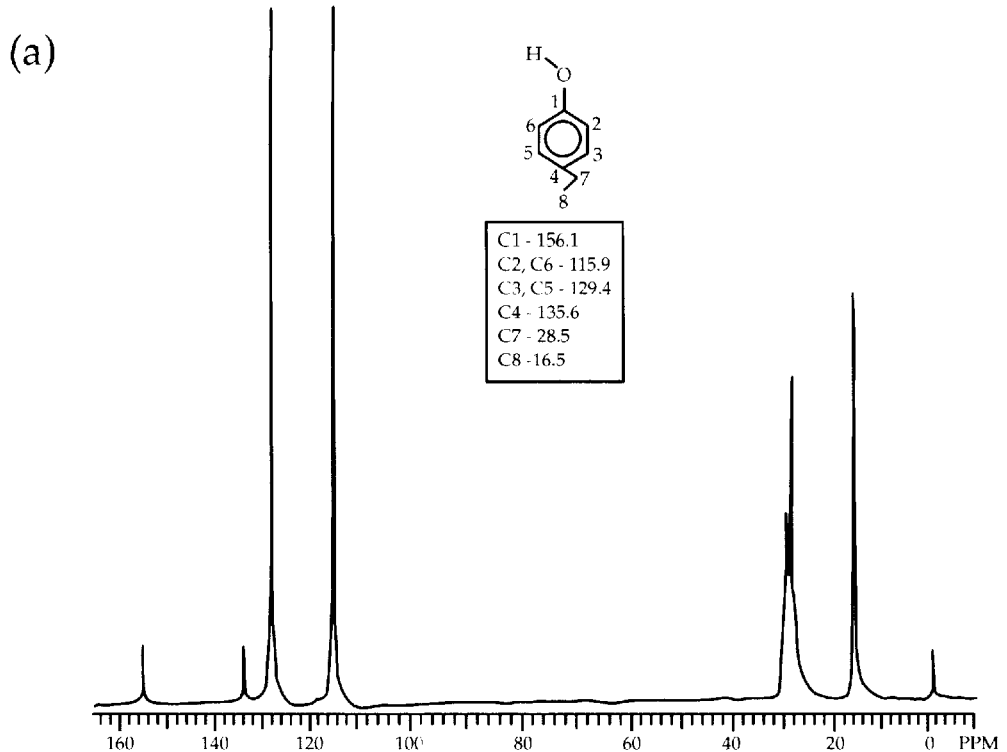
FIG. 2 is the $^{13}$C-NMR spectra for (a) p-ethylphenol and (b) poly(p-ethylphenol)
Figure 2:
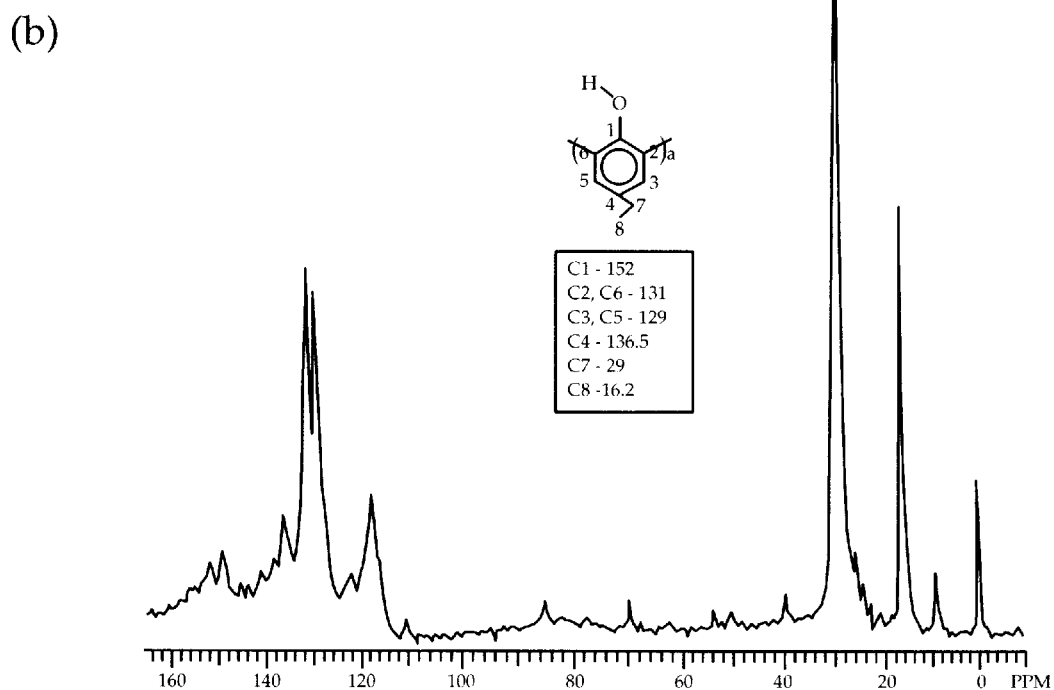

FIG. 1 illustrates the reaction scheme and the structures of monomers used. Crosslinking in polymer structure is expected in those cases where the ortho and para positions in the corresponding monomer structure are unsubstituted, as is the case with p-phenylphenol and m-cresol. As shown in FIGS. 2a & 2b, $^{13}$C-NMR studies on poly(p-ethylphenol) indicate that the linkage between any two adjacent phenyl rings is largely at the ortho positions. However, this type of linkage may strain the polymer backbone in such a manner that the phenyl rings are out of plane with respect to the adjacent rings. As a result, the polymer backbone may be forced into a coiled structure.

$^{13}$C-NMR spectra on the monomer and polymer were recorded on a 200 MHz Varian instrument (C broad band probe, Model XL-200, Palo Alto, Calif.). Deuterated acetone and tetramethylsilane (TMS) were used as the solvent and the internal standard, respectively. Infrared spectra were recorded on a Perkin-Elmer 1760 FTIR-FTRaman spectrophotometer at 4 cm$^{-1}$ resolution. The samples were cast as thin films on a KBr window from chloroform solutions. UV spectroscopy studies were carried out on a Beckman DU 7500 spectrophotometer.

FIGS. 2a & 2b illustrate $^{13}$C-NMR spectra and peak assignments for the monomer and the polymer, respectively. The peak for C2 & C6 (at 115.9 ppm in the monomer and 117 ppm in the polymer) diminished while an additional peak appeared at 131 ppm in the polymer. The peak position at 131 ppm is in agreement with the theoretically calculated peak position for ortho linkages on the ring. On the other hand, if the monomer were linked at meta positions on the ring, the peaks for C3 and C5 should shift downfield from 129.4 ppm in the monomer to 144 ppm in the polymer. However, the polymer spectrum in FIG. 2b shows no such peak, therefore ruling out linkages at meta positions. There was no significant change in the peak position for C4, therefore ruling out ether linkages. Although the hydroxyl groups are involved in the formation of free radicals leading to polymer formation, they do not appear to be involved in bond formation. In addition, previous infrared studies revealed no ether linkage in the polymer structure. Thus the phenyl rings in the polymer appear to be linked primarily at ortho positions. The presence of free hydroxyl groups is also indicated by FTIR [see FIG. 6a(i) and 6b(i)].

B. Molecular Weight Determination

Molecular weights were determined on a Waters LC Module I instrument with an on-line GPC column (GBR mixed bed linear column with a molecular weight range of 100 to over 20 million). A UV detector at 270 nm was used to detect the polymer. The GPC data were collected and processed with Millennium GPC software supplied with the instrument. An eluent flow rate of 1 ml/min was maintained under isocratic conditions. Narrow molecular weight polystyrene standards were used for calibration. All samples were filtered through 0.2 micron PTFE filters prior to injection. It was ascertained that the filters did not retain any polymer during filtration.

The effects of LiBr in DMF on aggregation phenomena, as reflected by the weight average molecular weight of poly(p-ethylphenol), were also determined. LiBr is used to get true chromatographic separation based upon $M_w$ (LiBr breaks apart aggregated polymer molecules). A precise measure of $M_w$ is necessary to determine the functional utility of polymer.

For GPC analysis, poly(p-ethylphenol) was completely dissolved at a concentration of 1 mg/ml in a series of DMF-based solutions with varying LiBr concentrations in the range of 0 to 1% (w/v). A given composition (between 0 and 1% LiBr/DMF) of the GPC solvent was prepared by mixing pure DMF and 1% LiBr/DMF in appropriate proportions. For all injections, the composition of the GPC solvent and the solvent used to prepare the sample for injection were identical. A mixture of polystyrene standards ($M_w$ 122 to 2.7 million, narrow distribution with polydispersity in the range of 1.02 to 1.2) was prepared in all compositions of LiBr and DMF, and always injected before analyzing the polyphenol sample in the corresponding solvent.

Dimethylformamide is a good solvent for solution studies of polyphenols. Earlier reports used a mixture of DMF and methanol, at a ratio of 4 to 1, as a GPC solvent in the determination of molecular weights of polyphenols. DMF is an interesting solvent, especially for polyhydroxy compounds such as polysaccharides and polyphenols. For example, amylose is not soluble is DMF, but the polysaccharide swells as DMF penetrates into and 'wets' the polymer. However, it is well known that in the presence of about 3% (w/v) LiBr, amylose could be dissolved at a concentration of about 1% (w/v) in DMF. Polyphenol, like a polysaccharide, is also a polyhydroxy compound. Although DMF easily dissolves poly(p-ethylphenol), there still may be inter/intramolecular associations in the polymer. These interactions may result in an apparently high molecular weight in GPC analysis.

The potential aggregation of polyphenol molecules, and the use of a mixture of DMF and methanol to break the association, is known. Molecular weights in the range of a few hundreds to a few thousands have been reported for a number of different polyphenols, with poly(p-phenylphenol) exhibiting a molecular weight of 26,000. Using an identical GPC solvent composition, molecular weights of over 400,000 for poly(p-phenylphenol) prepared in a dioxane/water system have been reported. Similarly, an average molecular weight of about 20,000 with DMF/methanol solvent mixture as GPC eluent for poly(p-ethylphenol) prepared in AOT reversed micelles has been observed. However, it is not clear if the solvent mixture of DMF and methanol at 4:1 ratio is optimal to deaggregate the polymer chains and give a true molecular weight. To address this problem, the molecular weights of poly(p-ethylphenol) prepared in reversed micelles and dioxane/water system and poly(p-phenylphenol) prepared in dioxane/water system were analyzed as a function of LiBr concentration in DMF and DMF/methanol mixture as GPC eluents.

Figure 3:
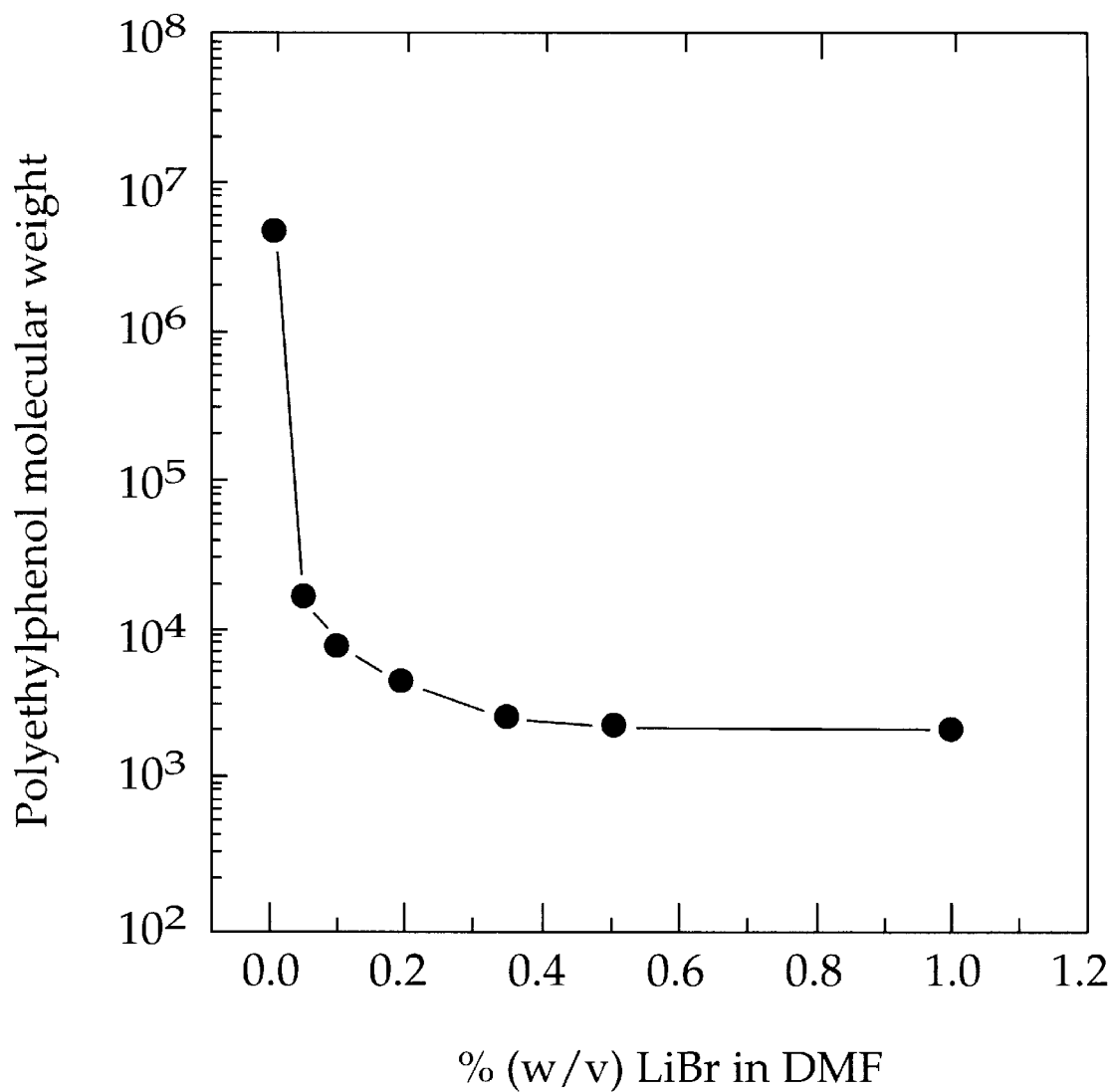
FIG. 3 is a graph of the effect of LiBr concentration in DMF on poly(p-ethylphenol) molecular weight.

FIG. 3 illustrates the effect of LiBr concentration in DMF as GPC eluent on the weight average molecular weight of poly(p-ethylphenol) prepared in reversed micelles. There is a dramatic decrease in the molecular weight by over three orders of magnitude when the LiBr concentration was increased from 0 to 0.35%. The molecular weight and dispersity of the polymer stabilized at about 2500 and 1.36, respectively, above 0.35% LiBr in DMF. Above this critical concentration of LiBr in DMF, there is no additional effect on the polymer a molecular weight.

An analogous phenomenon was observed with the solubility studies of amylose in DMF. Although DMF is capable of forming its own hydrogen bonds with the polysaccharide (as noted earlier, the polysaccharide swells in DMF, but is insoluble), it may not be able to completely disrupt the intermolecular forces. However, LiBr appears to be very effective in overcoming these intermolecular interactions. The polysaccharide becomes soluble at a concentration of 3% LiBr in DMF. It is possible that the solubility of the polyhydroxy compound is dictated by a fixed ratio between amylose and LiBr concentrations in DMF. The same argument applies to the molecular dissociation of poly(p-ethylphenol) in the presence of LiBr in DMF. Not unexpectedly, there was no effect of LiBr on the retention times of the polystyrene standards due to the lack of strong interchain interactions.

A mixture of DMF/methanol at 4:1 ratio was also used as the GPC solvent to determine the molecular weight of poly(p-ethylphenol) synthesized in AOT/isooctane reversed micelles. The result was a bimodal distribution with an average molecular weight of 90,000 and 300,000 for the two distributions. A similar bimodal molecular weight distribution was described by Akkara et al. for poly(p-phenylphenol). Molecular aggregation is still significant in this solvent system since the molecular weight of the sample dropped to about 2700 in the presence of 1% LiBr in DMF/methanol mixture at 4:1 ratio. Identical observations were made with a sample of poly(p-ethylphenol) synthesized in 85% dioxane/water system. Subsequently, a sample of poly(p-phenylphenol), synthesized in 85% dioxane/water, was analyzed for molecular weight both in DMF and DMF/methanol mixtures at different LiBr concentrations. As before, the polymer molecular weight dropped from well over 6 million to about 3400 on increasing LiBr concentration from 0 to 1% (w/v) in DMF. Similarly, poly(p-phenylphenol) showed a significant shift to lower molecular weight as the LiBr concentration in DMF/methanol mixture at 4:1 ratio was varied in the same concentration range as in DMF. In this case, the molecular weight dropped from about 500,000 to 3200. Table 1 lists the molecular weight and dispersity profiles of poly(p-ethylphenol) and poly(p-phenylphenol) synthesized under different conditions as a function of GPC solvent composition. Poly(p-ethylphenol) synthesized in reversed micelles exhibited a polydispersity of less than 1.4, and that prepared in bulk solvent, dioxane/water, >2. The average molecular weight of the polymer increased slightly as the surfactant concentration was increased, a phenomenon noted earlier.

TABLE 1

Molecular weight and dispersity profiles of poly(p-ethylphenol) and poly(p-phenylphenol) synthesized under different conditions as a function of GPC solvent composition.

| Sample | Synthesis medium | $M_w(M_w/M_n)^1$ | | | |
|---|---|---|---|---|---|
| | | (a) | (b) | (c) | (d) |
| Poly(p-ethylphenol) | AOT/isooctane reversed micelles | >4.5M (>2.5) | 2500 (1.4) | 300,000 (>2.0) | 2700 (1.4) |
| Poly(p-ethylphenol) | 85/15 dioxane/water | >6.0M (>2.5) | 3400 (>2.0) | 500,000 (>2.0) | 3200 (>2.0) |
| Poly(p-phenylphenol) | 85/15 dioxane/water | >6.0M (>2.5) | 3000 (>2.0) | 300,000 (>2.0) | 3200 (>2.0) |

[1]Molecular weights were determined with the following GPC solvents: (a) DMF; (b) 1% LiBr in DMF; (c) 4:1 DMF/methanol; and (d) 1% LiBr in 4:1 DMF/methanol.

C. Thermal Characterization

Thermal characterization of polymers was carried out on Du Pont thermal analyzers. For differential scanning calorimetry (DSC) analysis, the polymers were hermetically sealed, and heated under a nitrogen atmosphere at a temperature gradient of 10° C. per minute from room temperature to 300° C. Thermogravimetric analysis (TGA) was carried out at the same temperature gradient and under nitrogen atmosphere, but heated to 600° C.

Figure 4A:
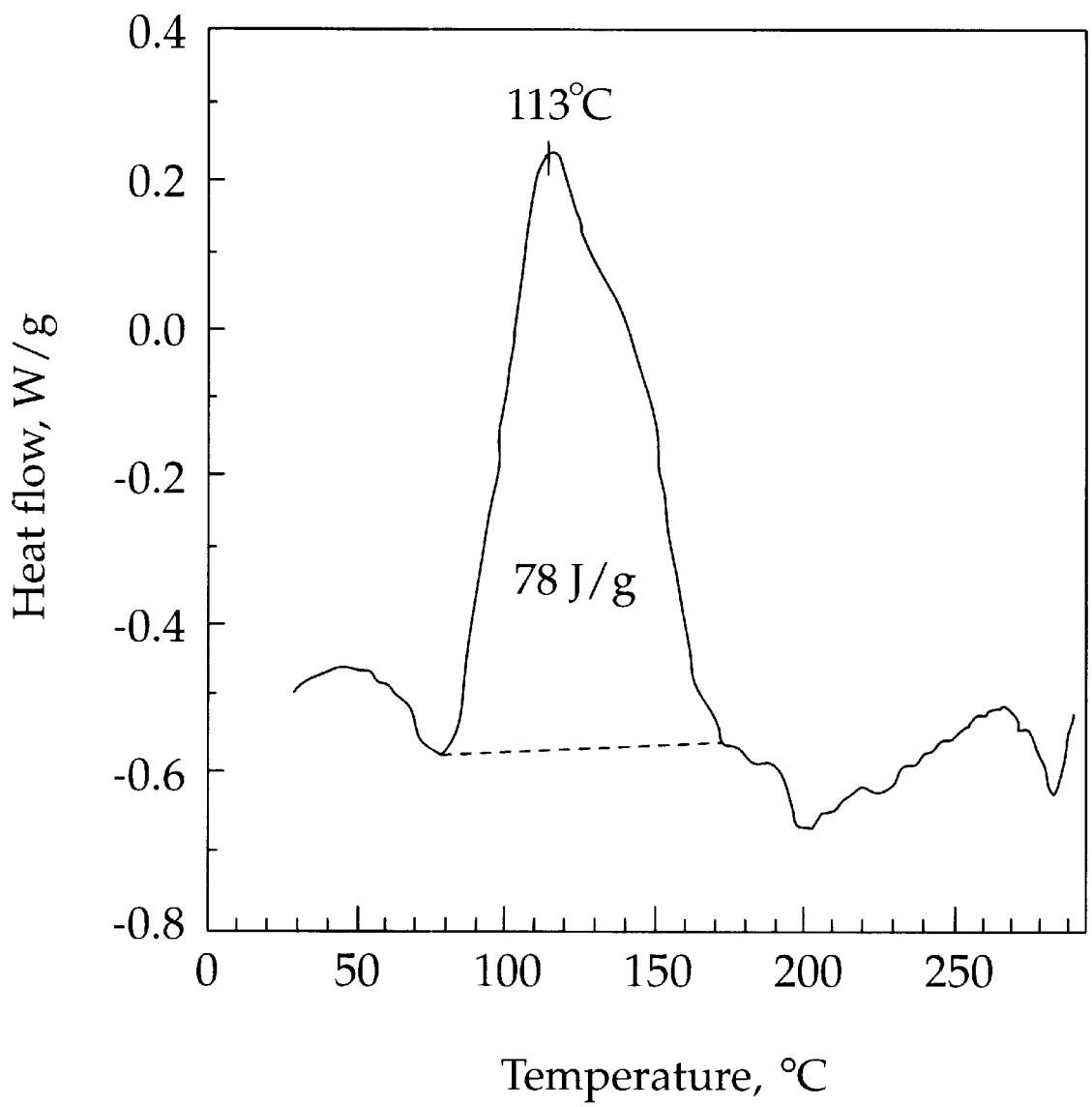
FIG. 4a is a differential scanning calorimetry (DSC) thermogram of poly(p-ethylphenol) prepared in reversed micelles.
Figure 4B:
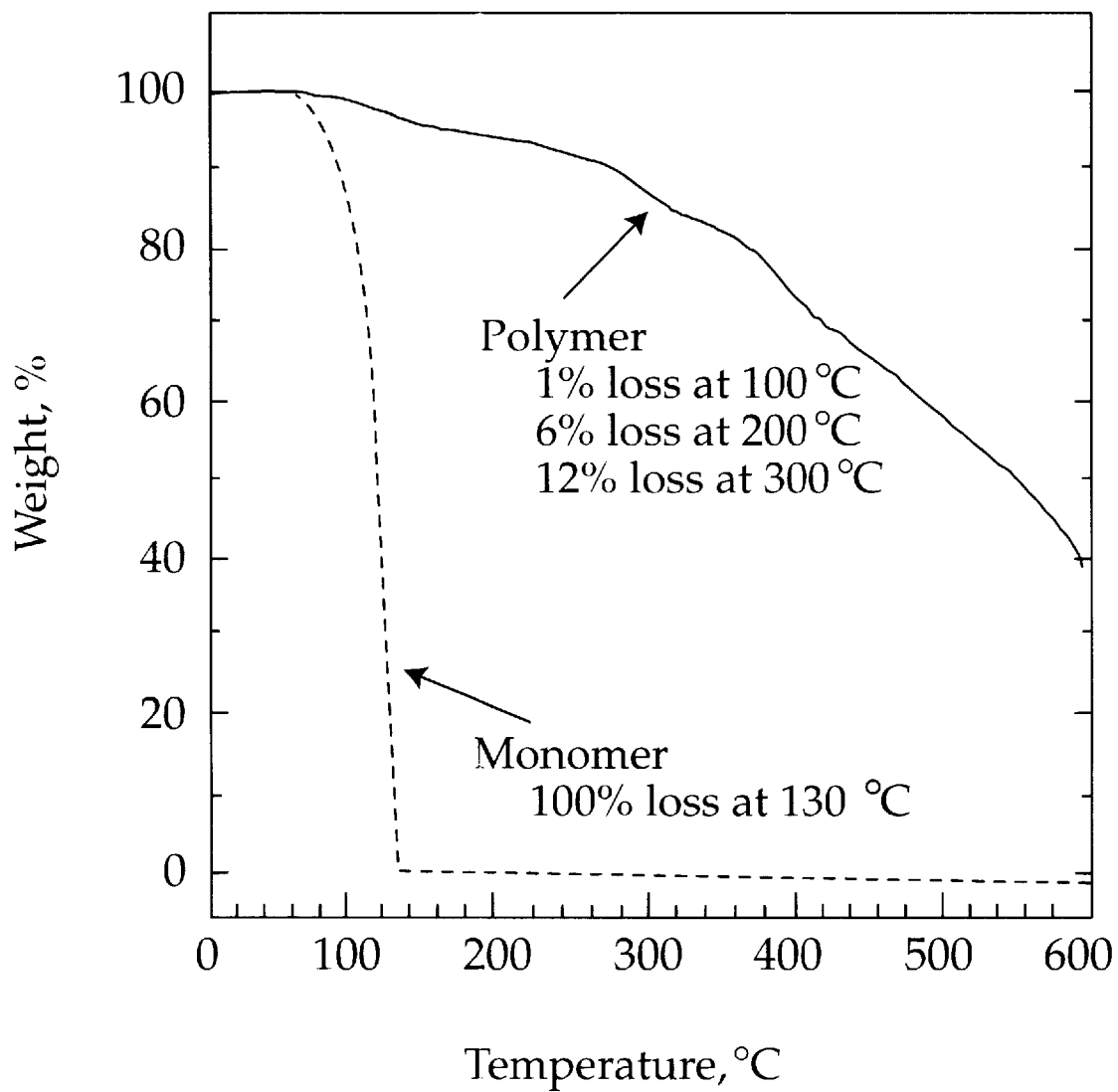
FIG. 4b is a thermogravimetric analysis (TGA) of p-ethylphenol and poly(p-ethylphenol) prepared in reversed micelles.

The thermal properties of p-ethylphenol and poly(p-ethylphenol) prepared in reversed micelles are illustrated as DSC and TGA thermograms in FIGS. 4a & 4b, respectively. The polymer was reasonably stable until a temperature of about 250° C., with a loss of less than 10% of the material (6% loss occurred at 200° C. presumably in part due to loss of water). The exotherm at about 110° C. in the polymer DSC thermogram may be due to cross linking in the polymer or due to loss of heat of crystallization. Once heated over 200° C., the exotherm was irreversibly lost.

Figure 5:
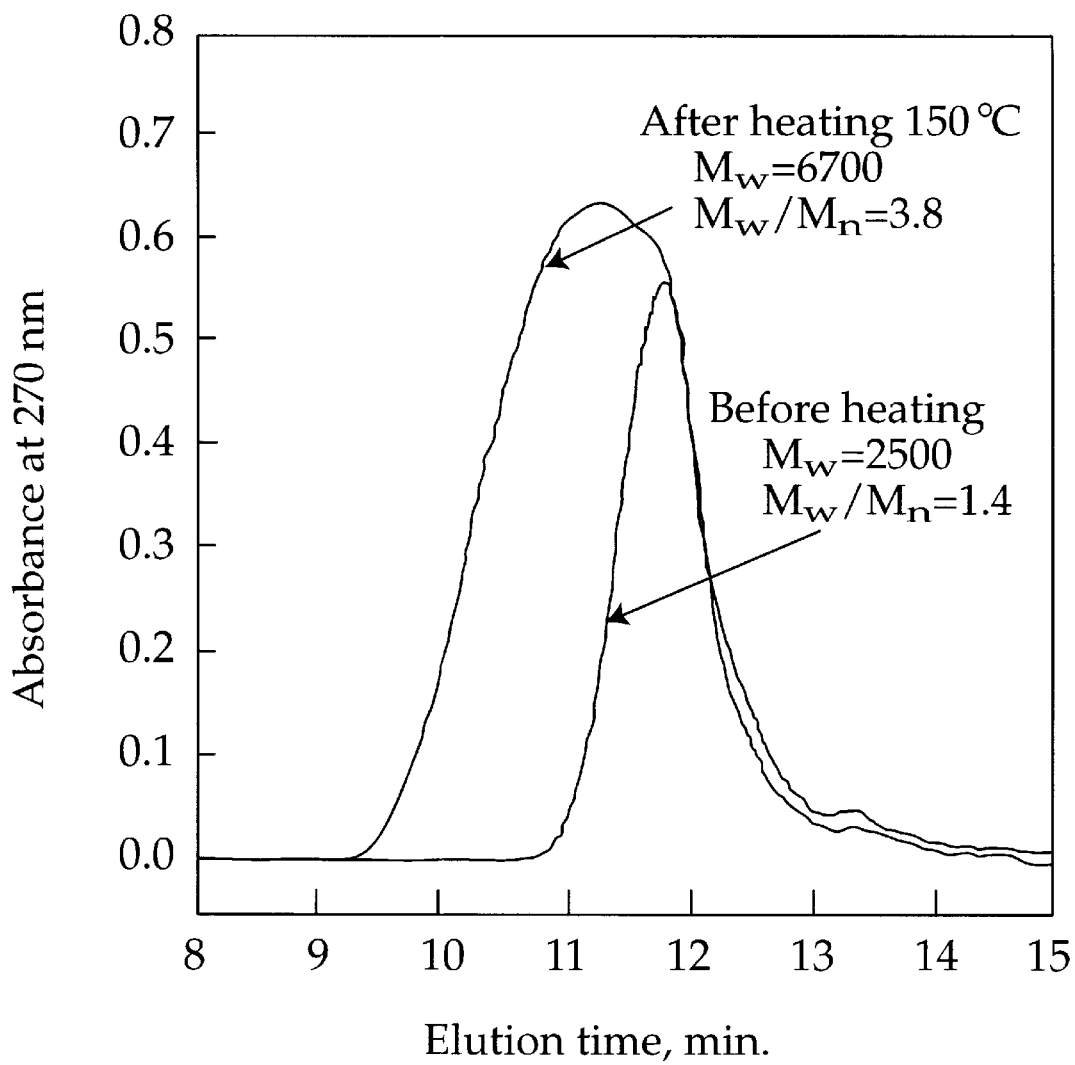
FIG. 5 shows the molecular weight distribution of poly (p-ethylphenol) before and after heating.

A 170% increase in molecular weight was observed, presumably due to cross-linking, when a sample of poly(p-ethylphenol) was heated to 150° C., and the polymer became significantly more polydisperse than the corresponding untreated polymer. FIG. 5 shows portions of the GPC profiles of poly(p-ethylphenol) before and after heating the polymer to 150° C. Both samples were easily soluble in 1 % LiBr/DMF solution that was used as eluent. X-ray diffraction studies on the samples revealed a partial crystallization of the heat-treated polymer.

EXAMPLE 4

Phenol polymerization was carried out in a mixture of DMF and water at various ratios to investigate the solvent effect on enzyme activity and on the polymer molecular weight. The objective was to investigate if the molecular weight of polyphenols could be controlled, while maintaining a reasonably narrow distribution, by varying reaction system parameters such as time of reaction, hydrogen peroxide concentration, and solvent composition. Table 2 sets forth the ranges of solubility parameters and dielectric constants covered by the solvent systems used for polymerization reactions.

TABLE 2

Ranges of solubility parameters and dielectric constants covered by the solvent systems used for polymerization reactions

| Solvent system | Solubility parameter (MPa½) | Dielectric constant |
|---|---|---|
| Isooctane/ | 14 | 2 |
| chloroform | 19 | 5 |
| DMF/ | 25 | 37 |
| water | 48 | 78 |
| 1,4-Dioxane/ | 20 | 30 |
| water | 48 | 78 |
| Ethanol/ | 26 | 24 |
| water | 48 | 78 |

The solvent mixtures, listed in Table 2, were selected on the basis of the range of solubility parameters that they cover. The wide variation in solubility parameters and dielectric constants for each system was similar to that found in certain supercritical fluids as a function of pressure. These properties not only influence the solubility of the growing polymer chain in the corresponding reaction medium, but significantly affect enzyme activity (solvents with high dielectric constants are known to denature the enzyme). However, unlike in supercritical fluids, the solvent properties can be varied at ambient conditions of pressure and temperature.

The reaction medium composition was varied from 100% DMF to 100% water. As before, the reaction was initiated with the addition of hydrogen peroxide at room temperature and with stirring. Interestingly, and analogous to the dioxane/water system, there was no sign of reaction (i.e., no heat or color generation) in the reaction mixtures containing 85% or more organic solvent, and the solutions remained clear throughout the addition of hydrogen peroxide. On the other hand, heat evolution (due to exothermic reaction) followed the reaction in solvents with 60% or less DMF, and the solutions became colored and opaque instantaneously.

It is clear that DMF sustained enzyme activity up to a concentration of 60%, although the presence of water was necessary. The monomer solubility in 20% DMF solution was poor, and solution turned into a stable emulsion prior to initiating the reaction. The reactions were continued for a few more hours before the solvent was evaporated under reduced pressure. The precipitates were washed with water and isooctane to remove buffer salt, the enzyme and any unreacted monomer. The dried precipitates were dissolved in 1% LiBr/DMF and their molecular weights were analyzed as described earlier. Table 3 shows the effect of solvent composition on the polymer molecular weight and dispersity (reactions in bulk and in the absence of reversed micelles).

TABLE 3

Effect of solvent composition on the polymer molecular weight and dispersity (reactions in the absence of reversed micelles)

| Synthesis medium | Monomer Conversion[1] | Polymer Yield | Mw | Mw/Mn | Comments |
|---|---|---|---|---|---|
| 100/0 DMF/water | 0% | 0% | | | no reaction |
| 85/15 DMF/water | 20% | 10% | 281 | 1.23 | dimers soluble in 85% DMF |
| 60/40 DMF/water | 80% | 75% | 612 | 1.20 | oligomers soluble in 60% DMF |
| 40/60 DMF/water | 80% | 80% | 675 | 1.05 | oligomers soluble in 40% DMF |
| 20/80 DMF/water | 75% | 75% | 658 | 1.02 | oligomers soluble in 20% DMF |
| 0/100 DMF/water | 50% | 35% | 400 | 1.90 | oligomers soluble in 100% DMF |
| 85/15 Dioxane/water | 80% | 15% | 3000 | 2.10 | insoluble polymer soluble oligomers |

[1]Monomer converted/monomer added initially

The polymer yield, defined as a ratio of the amount of polymer recovered as an insoluble fraction in isooctane to the amount of monomer converted, was about 75% for cases where the DMF content in the reaction mixture was between 20% and 60%. Molecular weight analyses revealed that the polymers were in fact oligomers with an average molecular weight of about 650, (significantly lower than that obtained with the AOT/isooctane reversed micellar system), and a polydispersity of 1.03–1.20. The molecular weight was not variable with DMF content, indicating that either the solubility of growing chains during the reaction was not sustained by DMF/water (up to 60% DMF) or the enzyme became inactive. Analogous to the dioxane/water system, the monomer conversion was either absent or poor at higher DMF contents, presumably due to significant enzyme inactivity.

Ethanol-HEPES buffer mixtures were also used to polymerize m-and p-cresol or p-ethylphenol in the study of molecular weight control. m-Cresol was studied in greater detail since it allows the study of a much broader molecular weight range than p-cresol or p-ethylphenol. Ethanol is a solvent of choice in view of its environmental compatibility and ease of regeneration. In addition, the enzyme is active in ethanol/buffer mixtures at levels up to at least 60% ethanol. Enzyme activity was studied as a function of ethanol content, and it was found that 20 to 40% ethanol was optimal for the conversion of about 50% monomer into polymer (20,000 molecular weight, DP of 200). At an enzyme concentration of 2 $\mu$M, the conversion was essentially complete in about 10 minutes. Although there was no significant improvement in the monomer conversion when the reaction was continued for 24 hours, the molecular weight of poly (m-cresol) increased by about 75%. Table 4 shows the effect of ethanol content on monomer conversion and the molecular weight of poly(m-cresol) in ethanol/water systems. Ethanol appears to be a useful solvent when higher molecular weight polymer is desired. Replacing HEPES buffer with deionized water resulted in no noticeable change in reaction rates or in polymer properties.

TABLE 4

Effect of ethanol content on monomer conversion and the molecular weight of poly(m-cresol) in ethanol/water systems. Polydispersity in all cases was >2.5. Unless noted otherwise, HRP concentration was 0.1 mg/ml

| Solvent Composition | Monomer conversion | Polymer $M_w$ | Comments |
|---|---|---|---|
| 100% buffer | 40% | 2200 | polymer removed once at the end; 60% conversion possible when HRP and $H_2O_2$ added in pulses |
| 100% buffer with 1% KCl | 40% | 1400 | polymer removed as it formed; 60% conversion possible when HRP and $H_2O_2$ added in pulses |
| 80/20 water/EtOH | 90% | 22000 | $M_w$ of 6000 to 22000 possible at intermediate stages of reaction |
| 60/40 water/EtOH | 47% | 10000 | Lower molecular weights possible at intermediate stages of reaction |
| 40/60 water/EtOH | 11% | 3000 | 90% conversion & 24000 $M_w$ at 5X enzyme concentration |
| 20/80 water/EtOH | 3% | — | 20% conversion & 2000 $M_w$ at 5X enzyme concentration |
| 100% EtOH | 0% | — | Insoluble enzyme |

Although high molecular weight polymers were produced with poly(m-cresol) due to cross-linking and with ethanol, in some applications, such as photoresists, oligomers are desirable. Hence, m-cresol was polymerized in 100% buffer/water, and as a result, the polymer molecular weight decreased to 2,500. During the reaction the polymer molecular weight gradually increased without significant improvement in monomer conversion. It was therefore attempted to isolate the polymer as the polymerization process continued. This was achieved by carrying out the reaction in the presence of 0.5 to 1 (w/v) % KCl in the medium. While the salt, up to around 3%, had no effect on the enzyme activity, it caused precipitation of the polymer as it formed. The polymer precipitate was isolated by filtration and the filtrate was returned to the reaction vessel. The enzyme in the filtrate was no longer active, therefore, enzyme and peroxide were added in pulses such that fresh enzyme was always available after each filtration to assure continued polymer formation. However, the rate of polymerization dropped as the reaction continued after each filtration in spite of the presence of significant amounts of the residual monomer, fresh enzyme, and hydrogen peroxide. The polymer yield was about 40% after completely adding all the enzyme and hydrogen peroxide to a final concentration of 2 $\mu$M enzyme and 30% stoichiometric excess of the peroxide. The polymer molecular weight was about 1,400. Further polymerization was still possible in the remaining reaction mixture if fresh enzyme and peroxide were further added. Therefore, the polymerization process could be continued, in theory, until all monomer was consumed. When the polymer was not removed by filtration and the reaction was run with the identical additions of enzyme and hydrogen peroxide, the final polymer molecular weight was over 2,000. The polydispersity was about 2.5 in both cases of whether the polymer was removed intermittently or not.

It is thus possible to control the polymer molecular weight by manipulating the reaction and/or process conditions. In the case of poly(m-cresol), it is possible to obtain control of molecular weight from 1,400 to 25,000, with a polydispersity of about 2.5, by the selection of the reaction medium. Enzyme activity is a function of the reaction medium composition which influences monomer conversion. However, the polymer molecular weight is also strongly influenced by the polymer solubility and the length of time it is in contact with the enzyme and reacting species in the reaction mixture, even after precipitation.

In order to minimize the enzyme inactivation, a less polar solvent than DMF or ethanol was sought as the reaction medium. Accordingly, chloroform was used to carry out the phenol polymerization reaction. A mixture of chloroform and isooctane was used for the reactions, and the polarity of the medium was gradually varied by adding chloroform and thus changing the composition from 100% isooctane to 100% chloroform. However, the enzyme powder was poorly dispersed in this solvent system, and it became necessary to prepare AOT reversed micelles with the chloroform/isooctane mixture, as described earlier. As the isooctane content in the reaction mixture was lowered from 100%, the polymer yield dropped from 100% (in pure isooctane reversed micelles) to about 10% (in pure chloroform reversed micelles) These results are shown in Table 5.

TABLE 5

Effect of solvent composition on the polymer molecular weight and dispersity (reaction in AOT reversed micelles) using isooctane and chloroform

| Synthesis medium | Monomer Conversion | Polymer Yield | Mw | Mw/Mn | Comments |
|---|---|---|---|---|---|
| 100% Isooctane | 100% | 100% | 2500 | 1.36 | $W_o$ = 15 |
| 100% Isooctane | 90% | 100% | 2500 | 1.38 | $W_o$ = 9 |
| 75/25 Isooctane/CHCl$_3$ | 100% | 85% | 1681 | 1.53 | $W_o$ = 9 |
| 50/50 Isooctane/CHCl$_3$ | 100% | 75% | 3461 | 1.85 | $W_o$ = 9 |
| 25/75 Isooctane/CHCl$_3$ | 75% | 35% | 3601 | 1.83 | $W_o$ = 9 phase separation |
| 100% CHCl$_3$ | 20% | 10% | 1000 | 1.07 | $W_o$ = 9 phase separation |

Polymer molecular weight was maximum at 50–75% chloroform in isooctane with a polydispersity of 1.5 to 1.9. However, the polymer exhibited a low polydispersity of 1.07 in 100% chloroform. The poor polymer yields at high chloroform contents are perhaps due to the formation of unstable microemulsion systems leading to phase separation. As a result, the contact between the enzyme and the monomer is inefficient and the polymer yield is poor. Smaller $W_o$ values also contribute to poor monomer conversion. One approach is to eliminate the surfactant altogether by polymerizing phenolic monomers in a biphasic system where large amount of water containing enzyme is mechanically dispersed in a hydrophobic organic solvent containing the monomer. Preliminary results indicate that a number of polymers including poly(p-ethylphenol) of molecular weight 2500 can be prepared in chloroform/buffer (50:50 v/v) or an isooctane/water (50/50) biphasic system.

The hydroxyl groups in enzymatically prepared polyphenols do not a participate in bond formation, as noted earlier from $^{13}$C-NMR studies. The FTIR spectrum of the polymer, shown in FIGS. 6a(i) and 6b(i), also illustrates the point with a broad peak at 3400 cm$^{-1}$ due to O—H stretch. Thus the hydroxyls on the polymer are available for chemical modifications such as esterification. Esterification was carried out in chloroform with palmitoyl and cinnamoyl chlorides in the presence of stoichiometric amount of pyridine to scavenge HCl produced in the reaction.

Figure 6A:
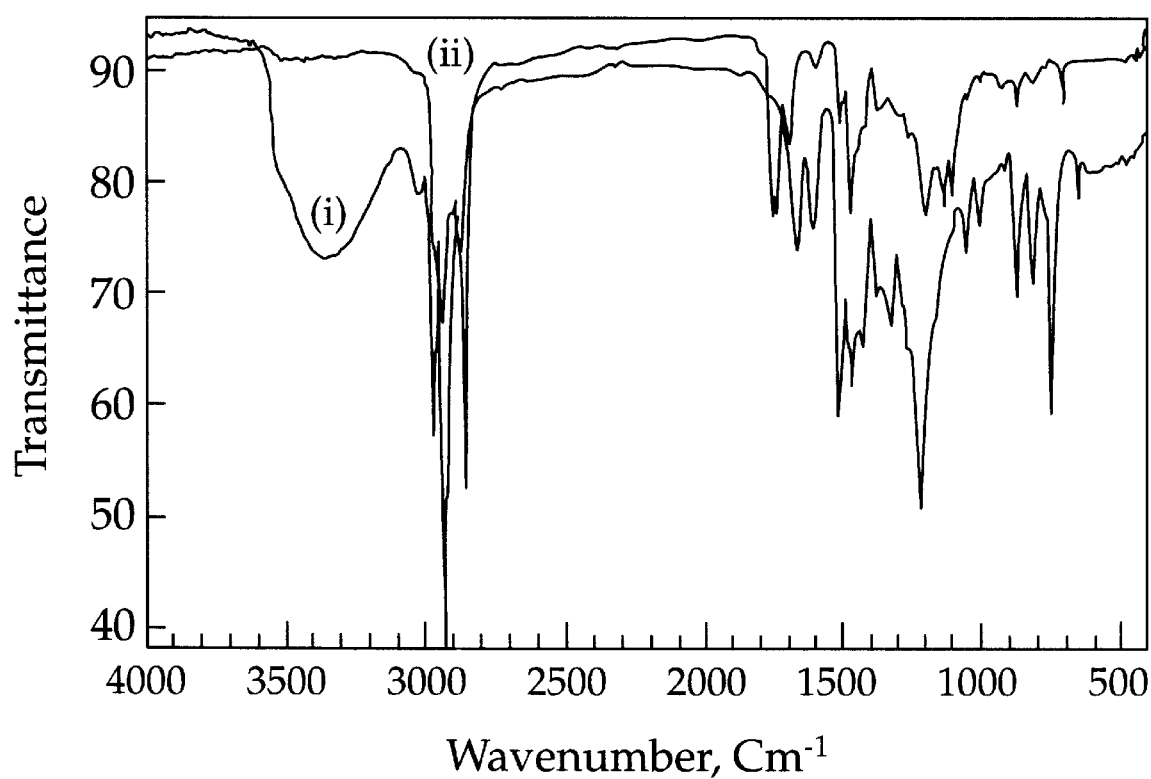
FIG. 6a shows FTIR spectra of poly(p-ethylphenol) (i) before and (ii) after esterification with palmitoyl chloride.
Figure 6B:
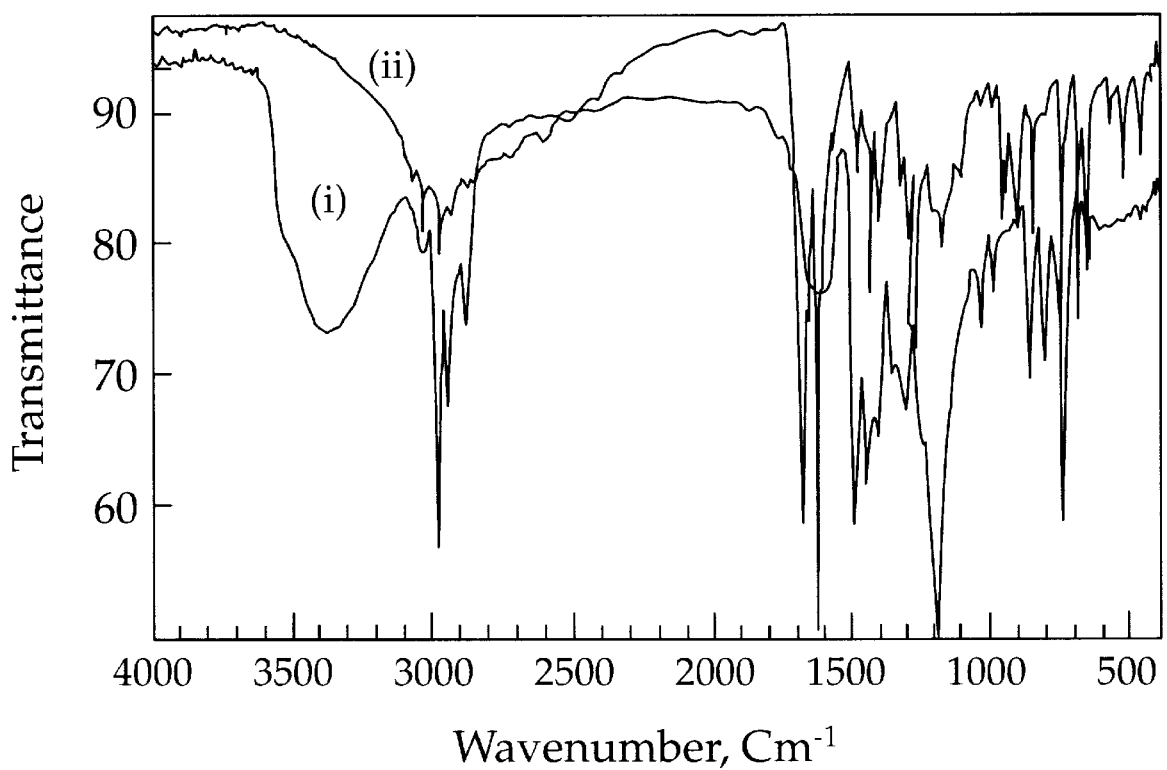
FIG. 6b shows FTIR spectra of poly(p-ethylphenol) (i) before and (ii) after esterification with cinnamoyl chloride.

FIGS. 6a and 6b illustrate FTIR spectra of poly(p-ethylphenol) before and after functionalization with palmitoyl and cinnamoyl moieties, respectively, at the hydroxyl groups of the polymer. FIG. 6a shows the presence of alkyl chains in the polymer due to palmitoyl groups, confirmed by the presence of strong peaks between 2800 and 3000 cm$^{-1}$ due to asymmetric and symmetric C—H stretch in methyl and methylene groups of the alkyl chains.

Figure 7:
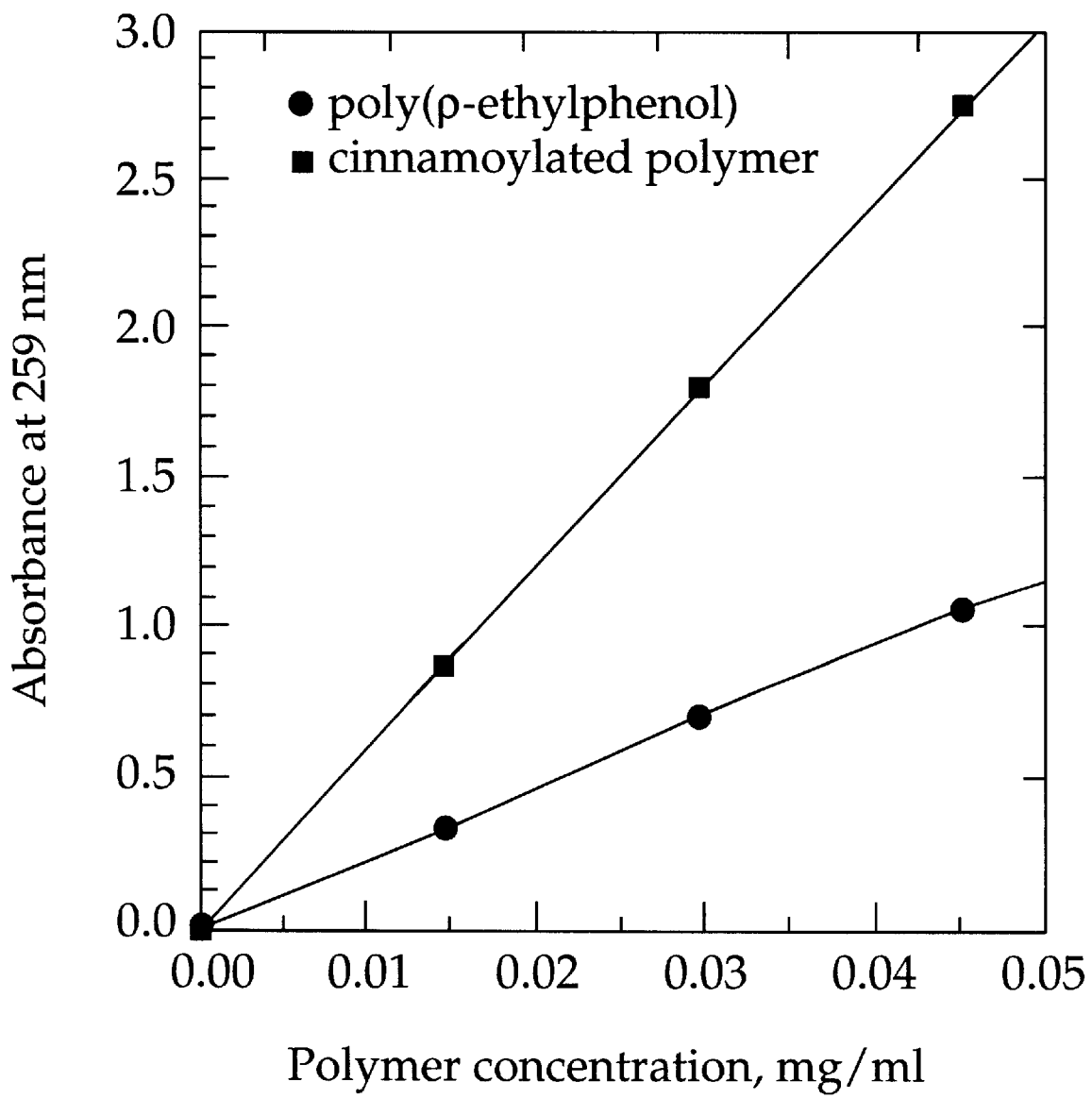
FIG. 7 shows the UV absorbance at 259 nm of poly(p-ethylphenol) before and after cinnamoylation.

In addition, the peak for O—H stretch at 3400 cm$^{-1}$ disappeared in the esterified polymer indicating the participation of the hydroxyl groups in the reaction. The ester formation was also confirmed by the presence of C=O stretch at 1750 cm$^{-1}$ in the modified polymer. Similarly, cinnamoylation of the polymer was confirmed by the disappearance of O—H stretch as well as from the strong presence of C=C ring stretch at 1600 cm$^{-1}$, shown in FIG. 6b. UV spectroscopic studies, carried out with acetonitrile solutions of the polymer, showed an increased absorbance for the cinnamoylated polymer at 259 nm due to the presence of additional phenyl ring, as shown in FIG. 7.

It will now be apparent to those skilled in the art that other embodiments, improvements, details and uses can be made consistent with the letter and spirit of the foregoing disclosure and within the scope of this patent, which is limited only by the following claims, construed in accordance with the patent law, including the doctrine of equivalents.

What is claimed is:

1. A method for controlling molecular weight and dispersity of a polymer, said polymer being formed by free radical polymerization using enzyme-catalyzed reaction, the method comprising the following steps:

(a) forming a solvent system having a solubility parameter and dielectric constant, said solvent system being a reaction medium for said polymerization;

(b) varying said solubility parameter for controlling growth of polymer chain, and varying said dielectric constant for affecting enzyme activity, said growth of the polymer chain in said solvent system continuing until a desired weight and dispersity are achieved and said polymer separates from the reaction medium;

(c) changing said dielectric constant for changing said enzyme activity for controlling the growth of the polymer chain, and thereby controlling the polymer molecular weight and dispersity;

(d) adding to the reaction medium an aqueous preparation of an enzyme;

(e) adding to the reaction medium and enzyme preparation, a monomer selected from the group consisting of phenols, aromatic amines, and their derivatives to form a reaction mixture;

(f) initiating a polymerization reaction by adding dropwise 30% hydrogen peroxide (w/w) (up to about 30% stoichiometric excess) while stirring the reaction mixture;

(g) continuing stirring for several hours;

(h) centrifuging the precipitate formed;

(i) repeated washing of the precipitate for removing any unreacted monomer; and (j) drying the final precipitate under a reduced pressure at 50° C.

2. The method of claim 1, wherein said solvent system comprises one or more of the solvents Isooctane, Alkanes with Carbon 6 through 10, Chloroform, DMF (dimethylformamide), 1,4-Dioxane, Ethanol, Water, and any related combination of solvents which form a reaction medium.

3. The method of claim 1, wherein said reaction medium is a reversed micelles system.

4. The method as claimed in claim 1, wherein said reaction medium is a monophasic system.

5. The method as claimed in claim 3, wherein said solvent system comprises a surfactant.

6. The method as claimed in claim 5, wherein said surfactant is dioctyl sodium sulfosuccinate (AOT).

7. The method of claim 1, wherein the enzyme is selected from the group consisting of peroxidases (such as horseradish peroxidase, soybean peroxidase, lignin peroxidase, manganese peroxidase, chloro peroxidase, cytochrome C peroxidase, tyrosinases, laccases, phenoloxidases, and aromatic amineoxidases).

8. The method of claim 1, wherein the monomer is p-ethylphenol.

9. The method of claim 1, wherein the monomer if m-cresol.

10. The method of claim 1, wherein the molecular weight of the polymer molecules is between 600 and 3,600.

11. The method of claim 1, wherein the polydispersity of the polymer molecules ranges from 1.02 to greater than 2.

12. The method of claim 1, wherein the polymer is modified by palmitoyl chloride to form palmitoyl ester of the polymer.

13. The method of claim 1, wherein the polymer is modified by cinnamoyl chloride, to form cinnamoyl ester of the polymer.

14. The method of claim 1, wherein the polymer is modified by biotin compounds to form a biotinylated polymer.

15. The method of claim 1, wherein the polymer is cast as thin film.

16. The method of claim 1, wherein the polymer is used as a photoresist material.

17. The method of claim 1, wherein the polymer is used as a UV absorbing material.

18. The method of claim 13, wherein the polymer is used as a UV absorbing material.

19. The method of claim 1, wherein said solubility parameter is controlled by adding a salt, such as potassium chloride, in the reaction medium.

* * * * *